US010241197B2

(12) United States Patent
Mellot

(10) Patent No.: US 10,241,197 B2
(45) Date of Patent: Mar. 26, 2019

(54) METHOD OF PREPARING HISTOGRAMS OF A SENSOR SIGNAL FROM AN ARRAY OF SENSORS, IN PARTICULAR PROXIMITY SENSORS, AND CORRESPONDING DEVICE

(71) Applicant: STMicroelectronics (Grenoble 2) SAS, Grenoble (FR)

(72) Inventor: Pascal Mellot, Lans en Vercors (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 15/938,435

(22) Filed: Mar. 28, 2018

(65) Prior Publication Data

US 2018/0217241 A1    Aug. 2, 2018

Related U.S. Application Data

(63) Continuation of application No. 15/050,561, filed on Feb. 23, 2016, now abandoned.

(30) Foreign Application Priority Data

Jul. 2, 2015   (FR) ..................... 15 56249

(51) Int. Cl.
G01S 7/486    (2006.01)
G01S 17/02    (2006.01)
G01S 7/487    (2006.01)
G01S 17/10    (2006.01)

(52) U.S. Cl.
CPC ............ *G01S 7/4865* (2013.01); *G01S 7/487* (2013.01); *G01S 17/026* (2013.01); *G01S 17/10* (2013.01)

(58) Field of Classification Search
CPC .............................. G01S 7/4865; G01S 7/487
See application file for complete search history.

(56) References Cited

U.S. PATENT DOCUMENTS

| 8,384,883 | B2 | 2/2013 | Heizmann et al. |
| 8,963,069 | B2 | 2/2015 | Drader et al. |
| 2013/0045004 | A1 | 2/2013 | Geyer |
| 2014/0103196 | A1 | 4/2014 | Soga et al. |
| 2015/0041625 | A1 | 2/2015 | Dutton et al. |

OTHER PUBLICATIONS

Dutton et al., "11.5 A time-correlated single-photon counting sensor with 14GS/s histogramming time-to-digital converter", IEEE International Solid-State Circuits Conference, Feb. 2015, pp. 1-3.
Niclass et al., "A 0.18-um CMOS SoC for a 100-m-Range 10-frame/s 200 x 96-pixel time-of-flight depth sensor", IEEE Journal of Solid-State Circuits, val. 49, No. 1, Jan. 2014, pp. 315-330.

*Primary Examiner* — Anthony Ho
(74) *Attorney, Agent, or Firm* — Slater Matsil, LLP

(57) ABSTRACT

A method includes preparing a first histogram from the emission of initial optical radiation and including at least one processing iteration performed at a rate of a clock signal having an internal period equal to a sub-multiple of the optical period a sensor signal and a reference signal. Successive iterations of histogram preparation are performed so that in each iteration a time shift of the initial optical radiation is provided by a first fraction of the internal period until at least one portion of the internal period is covered to obtain an additional histogram at the conclusion of each iteration. A numerical combination of the first histogram and additional histograms is performed to obtain a final histogram having a finer time granularity than that of the first histogram.

20 Claims, 4 Drawing Sheets

METHOD OF PREPARING HISTOGRAMS OF A SENSOR SIGNAL FROM AN ARRAY OF SENSORS, IN PARTICULAR PROXIMITY SENSORS, AND CORRESPONDING DEVICE

CROSS-REFERENCE TO RELATED APPLICATIONS

This application is a continuation of U.S. patent application Ser. No. 15/050,561, filed on Feb. 23, 2016, which application claims priority to French Patent Application No. 1556249, filed Jul. 2, 2015, which applications are hereby incorporated herein by reference.

TECHNICAL FIELD

This disclosure relates to the preparation of histograms of a sensor signal from an array of sensors, such as proximity sensors, for example, for recognizing movement of an object.

BACKGROUND

In general, proximity sensors are sensors configured for detecting and/or measuring the presence of an object close to the sensors without any physical contact. Such sensors are known to those skilled in the art and may be used for detecting the presence of an object or a gesture performed above a tablet, a cellular mobile telephone, or other similar electronic apparatus, with which an action is associated.

Radiation of optical light, e.g., infrared or laser light, is generally emitted towards an object close to the sensors to measure the Time-of-Flight (TOF) of this radiation. In other words, this is the time that elapses between light emission and reception by the sensor after reflection on the object.

However, the optical light detected by the sensors may be too low to generate an analog voltage representing the flow of optical light. In fact, the optical signal may include only a few photons per excitation/emission cycle. The desired time resolution is therefore often difficult to achieve with conventional electronic transient recorders.

One approach for addressing this problem is Time-Correlated Single Photon Counting (TCSPC). With a periodic excitation emanating, for example, from a laser, it is possible to extend a collection of data from the optical signal over several excitation and emission cycles. This approach is based on a precisely timed repetitive recording of each photon of optical light radiation, e.g., laser radiation, taking the optical period of the radiation as a time reference.

To this end, several types of single photon sensitive detectors may be used, such as Single Photon Avalanche Diodes (SPADs). In this regard, the histogram functionality is particularly useful for proximity sensors, e.g., of the SPAD type, for preparing precise timing information on the arrival of each individual photon resulting from optical light radiation.

Histogram use is a helpful feature for proximity sensors because histograms may be configured for complementing a closed circuit system, such as with proximity sensors, to operate as a TOF reading circuit coupled with a modulated light source and to provide additional information. In particular, this may allow detection of the presence of multiple objects.

However, the time resolution of histograms of SPAD proximity sensors is generally limited by the main internal clock having the highest frequency within the sensors. Histograms having a finer resolution may be prepared using specific high-frequency circuits, which are generally complex and costly in terms of silicon surface area.

SUMMARY

One example implementation provides for reusing the existing circuits of a proximity sensor to generate a series of histograms by iteratively performing a time shift of the optical light radiation emitted by the sensor. The obtained series of histograms may be processed to obtain a finer time granularity than that of the histogram series without any implementation of complex high-frequency circuits.

According to one aspect, a method is provided of preparing histograms of a sensor signal from a sensor array illuminated by an optical radiation resulting from the reflection on an object of a periodic initial optical radiation. The method may include a step (a) of preparing a first histogram from the emission of the initial optical radiation and including at least one processing performed at the rate of a clock signal having an internal period equal to a submultiple of the optical period, of the sensor signal and of a reference signal. Successive iterations of step (a) may then be performed with each iteration having a time shift of the initial optical radiation by a first fraction of the internal period, until at least one portion of the internal period is covered, to obtain an additional histogram at the conclusion of each iteration. The method may further include a numerical combination of the first histogram and additional histograms to obtain a final histogram possessing a finer time granularity than that of the first histogram.

Thus, the final histogram is obtained through producing successive histograms by shifting the optical pulse and through reconstruction by post-processing. This makes it possible to obtain finer and more precise additional information as a result of the final histogram, and without implementing complex high-frequency circuits.

According to one implementation, step (a) may further include multiple successive processings, performed at the rate of the clock signal, of the sensor signal and of the reference signal successively time shifted with respect to the initial optical signal until the entire optical period is covered. In one example embodiment, step (a) may further include:

(a1) preparing a first portion of the first histogram from the emission of the initial optical radiation over an acquisition cycle including multiple optical periods, where the initial optical radiation begins at the same first instant within each optical period of the acquisition cycle, with the preparation including processing, at the rate of the clock signal, the sensor signal and the reference signal located at the same second instant within each optical period of the acquisition cycle;

a2) repeating step (a1) with a time shift of the reference signal by an initial fraction of the optical period corresponding to a whole number of internal periods to obtain another portion of the first histogram;

a3) repeating step (a2) until the entire optical period is covered and the first complete histogram is obtained.

The initial fraction of the optical period may correspond to two internal periods, for example. According to one example implementation, the numerical combination may include subtracting two consecutive histograms to obtain one differential histogram. In accordance with another example, the optical period may be equal to n times the internal period, and the first fraction may be equal to the internal period divided by n. By way of example, each sensor may be a proximity sensor.

According to another aspect, an electronic device is provided for recognizing movement of an object. The electronic device may include an emitter for emitting optical radiation based upon an optical period, a sensor array for receiving optical radiation reflected from an object based upon periodic initial optical radiation emitted by the emitter, with the sensor array configured to generate a sensor signal. A processor is configured to prepare a first histogram from the emission of the initial optical radiation and from at least one processing performed at the rate of a clock signal having an internal period equal to a submultiple of the optical period of the sensor signal and of a reference signal. A controller may be configured to iteratively activate the processor such that in each iteration a time shift of the initial optical radiation by a first fraction of the internal period is performed, until at least one portion of the internal period is covered, to thereby obtain an additional histogram at the conclusion of each iteration. Furthermore, a calculator may be configured to perform a numerical combination of the first histogram and additional histograms to obtain a final histogram possessing a finer time granularity than that of the first histogram.

According to one example embodiment, the processor may be configured to prepare the first histogram from the emission of the initial optical radiation and from multiple successive processings performed at the rate of the clock signal, with the sensor signal and of the reference signal successively time shifted with respect to the initial optical signal until the entire optical period is covered.

In accordance with one example, the processor may include a processing module configured to prepare a first portion of the first histogram from the emission of the initial optical radiation over an acquisition cycle including multiple optical periods. The initial optical radiation may begin at the same first instant within each optical period of the acquisition cycle. The preparation may include processing, at the rate of the clock signal, the sensor signal and the reference signal located at the same second instant within each optical period of the acquisition cycle. Moreover, the controller may be configured to reactivate the processing module with a time shift of the reference signal by an initial fraction of the optical period corresponding to a whole number of internal periods to obtain another portion of the first histogram, and then reactivate the processing module for performing repetitions of the time shift of the reference signal until the entire optical period is covered and the first complete histogram is obtained.

According to one embodiment, the initial fraction of the optical period may correspond to two internal periods. In accordance with another example, the numerical combination may include subtracting two consecutive histograms to obtain one differential histogram.

According to an example embodiment, the optical period may be equal to n times the internal period, and the first fraction may be equal to the internal period divided by n. By way of example, each sensor may be a proximity sensor.

According to yet another aspect, an electronic apparatus is provided (e.g., a tablet or cellular mobile telephone) incorporating a device as briefly described above.

BRIEF DESCRIPTION OF THE DRAWINGS

Other advantages and features will be understood with reference to the detailed description of non-limiting example embodiments, and the accompanying drawings, in which.

DETAILED DESCRIPTION OF ILLUSTRATIVE EMBODIMENTS

Figure 1:
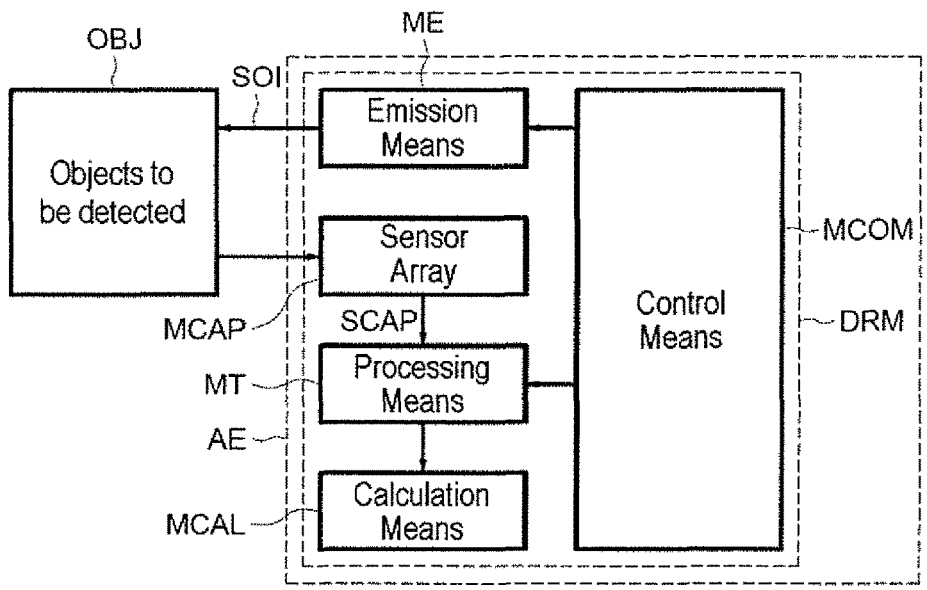
FIG. 1 is a block diagram of an electronic apparatus in accordance with an example embodiment.

Referring initially to FIG. 1, an electronic apparatus AE (e.g., a tablet, cellular mobile telephone, etc.) illustratively includes a device DRM for recognizing movement of an object OBJ, for example. The device DRM includes an emitter or emission means ME configured for emitting periodic optical radiation with an optical period PO. In order to obtain a short optical period PO, optical radiation of a high frequency is generally used. By way of non-limiting example, optical radiation may be used from a Vertical-Cavity Surface-Emitting Laser (VCSEL) diode. The frequency and phasing of the optical radiation may be controlled by a controller or control means MCOM of the DRM device, which will be described in more detail below.

When the device DRM is in operation, the emitter ME emits at least one periodic initial optical radiation SOI. If one or more objects OBJ are present in the initial optical radiation, the device DRM may receive reflected light radiation resulting from a reflection of the initial optical radiation on the object(s).

The device DRM further includes a sensor array MCAP that is illuminated by the optical radiation reflected from the object OBJ, or objects of the periodic initial optical radiation. Each sensor of the sensor array MCAP may receive the reflected optical radiation. In order to perform a time-correlated single photon count, the sensor array MCAP is configured for generating a sensor signal SCAP if at least one sensor in the sensor array MCAP receives an excitation of the optical radiation resulting from reflection.

As the sensor signal SCAP corresponds to individual time-correlated photons detected by the sensor array MCAP, multiple acquisition cycles each including numerous optical periods PO (e.g., one hundred thousand optical periods PO) are used. This is so that a histogram may be statistically prepared that is capable of representing the reflected optical radiation related to one optical period PO. The device DRM further illustratively includes a processor or processing means MT receiving the sensor signal SCAP and configured for preparing histograms of the sensor signal on these acquisition cycles.

Figure 2:
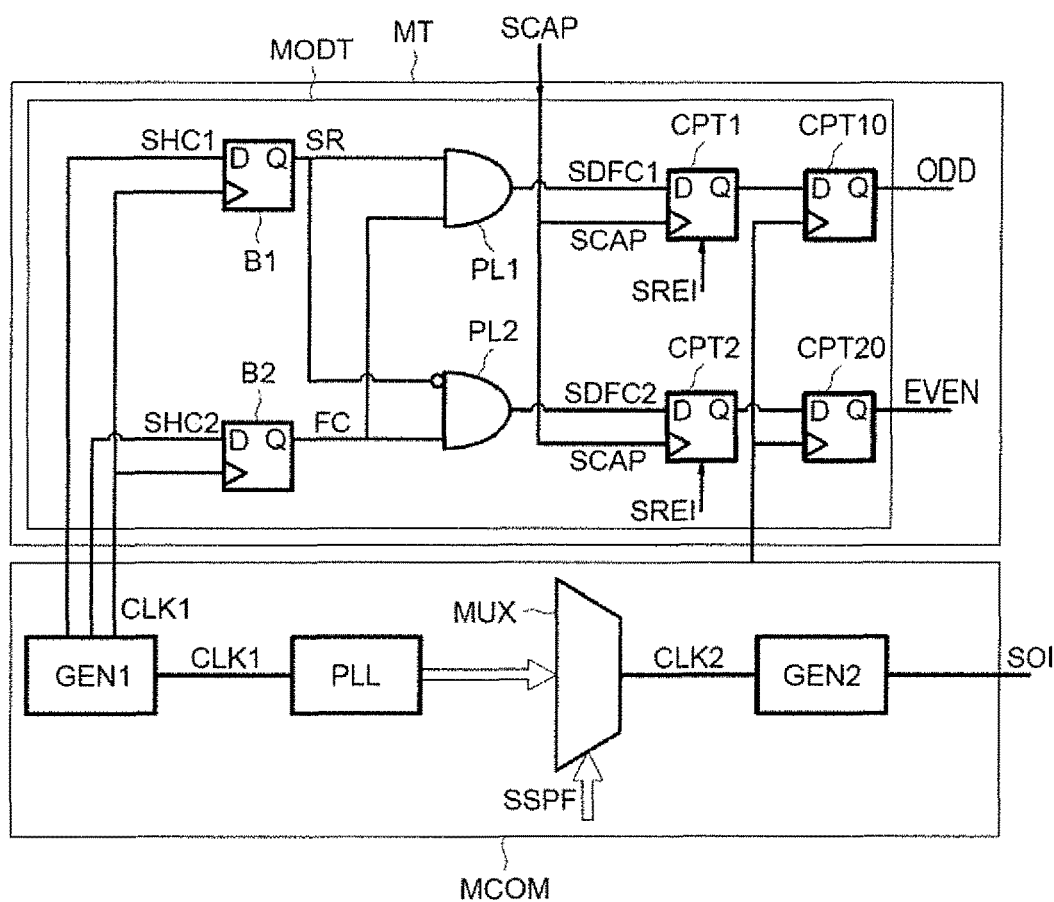
FIG. 2 is a schematic block diagram of an example embodiment of the controller and processor of FIG. 1.

Reference will now be made to FIG. 2 for illustrating in greater detail the controller MCOM and the processor MT, additionally including a processing module MODT. The controller MCOM illustratively includes a multi-phase-locked loop (PLL) configured for delivering a first, [o] phase, clock signal CLK1, to a first time generator GEN1, and clock signals of different phases, e.g. phases [7:0], to a multiplexer MUX. The multiplexer MUX receives a phase selection signal SSPF and generates a second clock signal CLK2.

The controller MCOM further includes a second time generator GEN2 which receives the second clock signal CLK2 as an input, and is configured for delivering the successive optical pulses of the initial optical signal SOI within successive optical periods PO. According to the phase selected, the optical pulse may be more or less time shifted within the corresponding optical period.

The optical period PO is equal to n times the period PI of the clock signal CLK1. By way of example, n may be equal to 8.

The processing module MODT includes two flip-flops B1 and B2 respectively receiving the control signals SHC1 and SHC2, and they are timed by the first clock signal CLK1. A reference signal SR and a counting time window signal SFC are obtained respectively at their outputs, which are delivered to two logic gates PL1 and PL2 generate two signals SDFC1 and SDFC2 each corresponding to one counting time half-window.

The processing module MODT further illustratively includes two first counters CPT1 and CPT2 receiving the sensor signal SCAP and the two signals SDFC1 and SDFC2. The two first counters CPT1 and CPT2 are reset after each period of the signal CLK1 by a reset signal SREI, and two second counters CPT10 and CPT20, designated as "odd" and "even". They are respectively connected in series to the two first counters CPT1 and CPT2 and configured for respectively constructing two counting values or signals termed "odd" and "even". These "odd" and "even" signals are used for preparing histograms as described in more detail below.

Each counting time window signal SFC covers one portion of an optical period PO, here, for example, a quarter of an optical period or two periods PI. The reference signal SR is configured for beginning in the middle of the counting time window FC.

Consequently, the signals SDFC1 and SDFC2 delivered by the two logic gates PL1 and PL2 correspond respectively to the counting time half-window preceding the occurrence of the reference signal SR, and that following the occurrence of the reference signal SR. If the sensor signal SCAP arrives during the counting time half-window preceding the occurrence of the reference signal SR, the counter CPT1 is incremented and the counter CPT10 accumulates the pulses received during the acquisition cycle for generating an "odd" histogram class or "bin".

By analogy, if the sensor signal SCAP arrives during the counting time half-window following the occurrence of the reference signal SR, the counter CPT2 is incremented and the counter CPT20 accumulates the pulses received during the acquisition cycle for generating an "even" histogram bin. The preparation of these two "odd" and "even" histogram bins forms a processing step Ei and leads, at the conclusion of an acquisition cycle, to the preparation of one portion Pi of a complete histogram.

Figure 3:
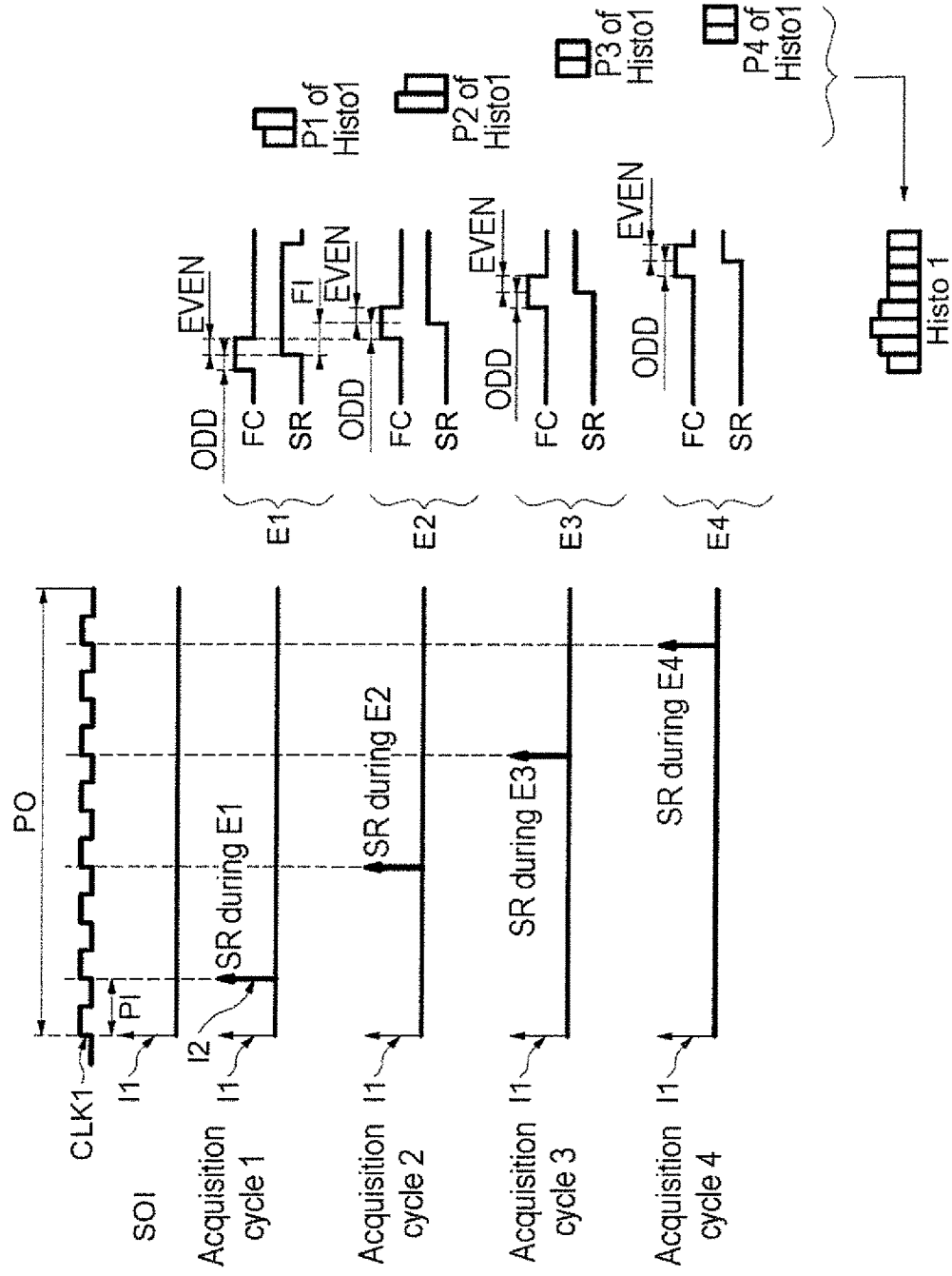
FIG. 3 is a timing diagram illustrating the preparation of a first histogram by the apparatus of FIG. 1 in accordance with an example embodiment.

Referring now to FIG. 3, preparation of a first histogram Histo1 from the emission of the initial optical radiation over four acquisition cycles is shown. In the first acquisition cycle, the optical pulse begins at the same first instant I1 within each optical period PO, here, for example, at the beginning of the optical period PO. The reference signal SR is located at the same second instant I2 within each optical period PO, here, for example, at the beginning of the second internal period PI, i.e., in the middle of the counting window FC.

At the conclusion of the processing step E1, a first portion P1 of the histogram Histo1 is obtained from the values of the counters CPT10 and CPT20. In the following acquisition cycle the controller MCOM is configured for reactivating the processing module MODT, this time with a time shift of the reference signal SR by an initial fraction FI of the optical period PO, here, for example, two internal periods PI, to obtain a second portion P2 of the first histogram Histo1. During each optical period PO, the instant I1 is not modified.

Then, the controller MCOM reactivates the processing module MODT twice in succession, each time repeating the time shift of the reference signal SR by the initial fraction FI of the optical period PO until the entire optical period PO is covered. Four steps E1 to E4 are therefore obtained corresponding to the four histogram portions P1 to P4. Thus, the first complete histogram Histo1 is obtained.

To obtain a finer time resolution than that of the first histogram Histo1, the controller MCOM is further configured for activating the processor to successively prepare additional histograms using, for each additional histogram, the processing steps E1 to E4 described above, but shifting the optical pulses by a fraction PF of the period PI. As the optical period PO may be equal to n times the period PI, the first fraction PF may be equal to the internal period PI divided by n, e.g. PI/8.

Figure 4:
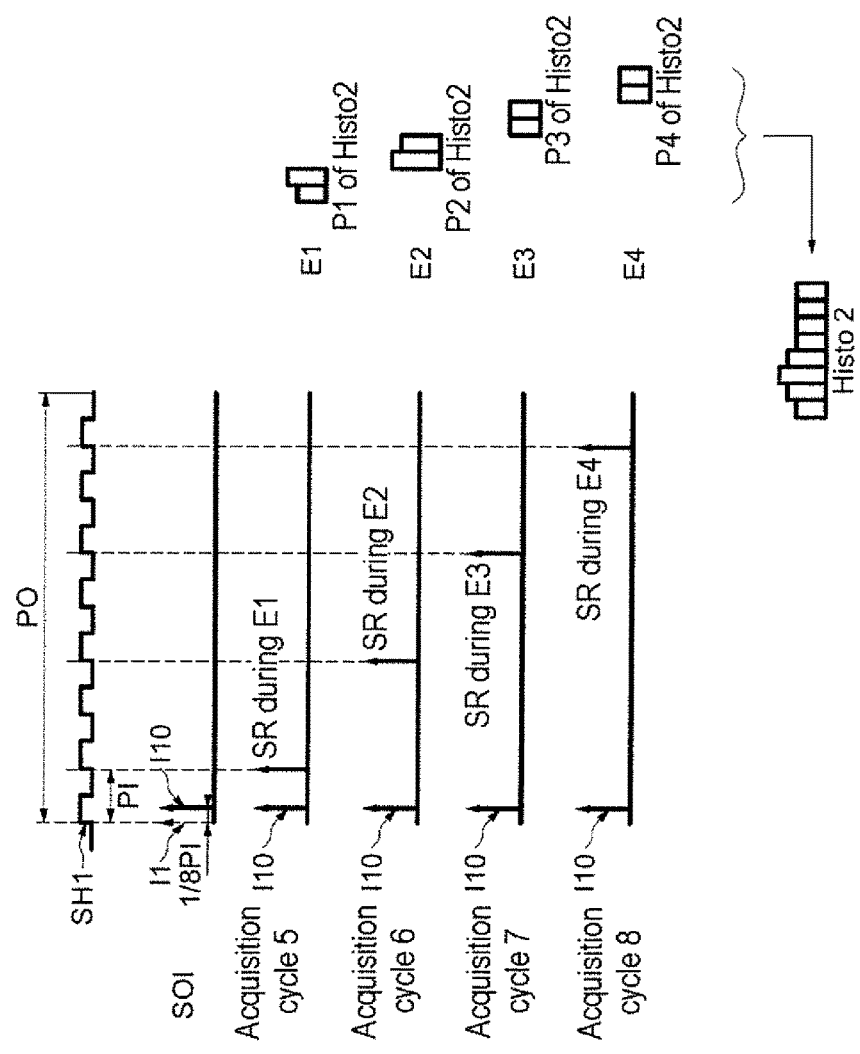
FIG. 4 is a timing diagram illustrating the preparation of a second histogram by the apparatus of FIG. 1 in accordance with an example embodiment.

Preparation of a first additional histogram Histo2 during the acquisition cycles 5 to 8 with a first optical signal shifted the first fraction PF is shown in FIG. 4. Here, the beginning instant I10 of the optical pulse is constant during the four new acquisition cycles, but time shifted by one eighth of period PI with respect to the instant I1 is used for obtaining the histogram Histo1. During each of the acquisition cycles 5 to 8, two histogram bins are generated by processing step Ei, which forms one portion Pi of the first additional histogram Histo2.

Figure 5:
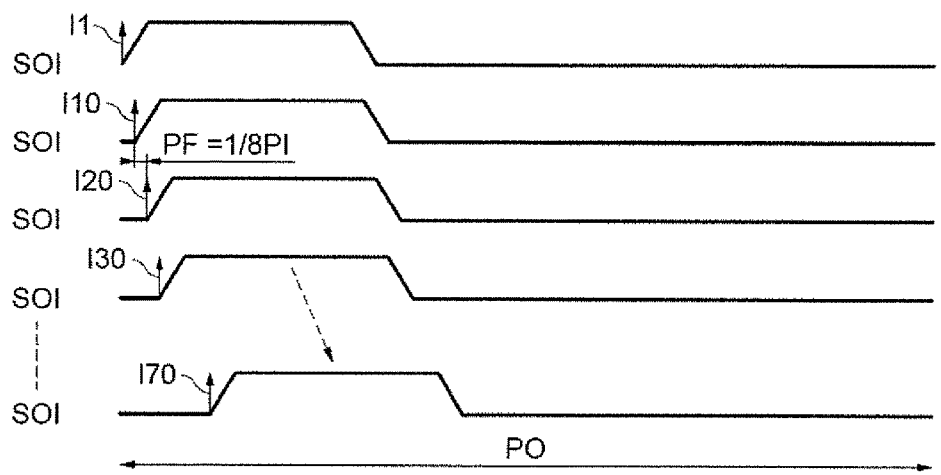
FIG. 5 is a timing diagram illustrating the preparation of subsequent histograms by time-shifting optical pulses by the apparatus of FIG. 1 in accordance with an example embodiment.

Referring now to FIG. 5, new additional histograms are prepared by shifting each time for each additional histogram the beginning instant I20, I30, . . . , I70 of the optical pulse in the course of the optical period, by one eighth of period PI with respect to the beginning instant I10, I20, . . . , corresponding to the preceding histogram. Although this is optional, these successive shifts may be performed until a complete period PI is covered to obtain the additional histograms Histo2 to Histo8.

Figure 6:
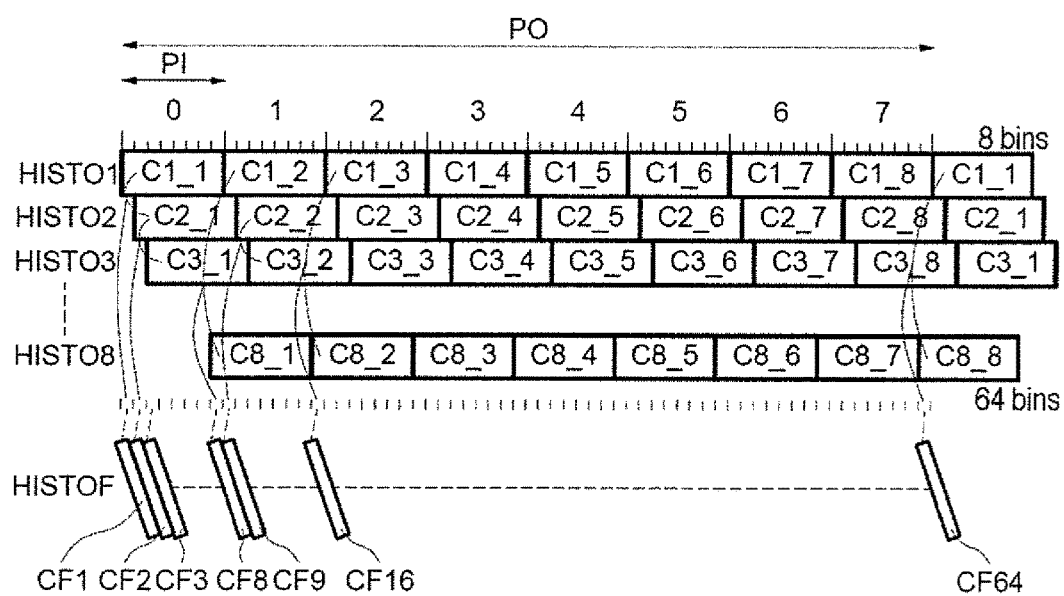
FIG. 6 is a schematic diagram illustrating differential histogram calculation by the apparatus of FIG. 1 in accordance with an example embodiment.

In addition, the device DRM illustratively includes a calculator or calculation means MCAL configured for performing a numerical combination of the first histogram Histo1 and additional histograms Histo2 to Histo8. This numerical combination may include a subtraction of two consecutive histograms so as to obtain one differential histogram HistoF (FIG. 6).

By way of example, the calculator MCAL may first perform a subtraction of histograms Histo1 and Histo2, e.g., Histo1-Histo2. The results of this subtraction form de facto a first series of shifted bins of the final histogram HistoF.

More particularly, the result of the subtraction, e.g., of the first bins C1_1 and C2_1 of the histograms Histo1 and Histo2, forms the first bin CF_1 of the final histogram HistoF. The result of the subtraction of the second bins C1_2 and C2_2 of the histograms Histo1 and Histo2 on the other hand forms the ninth bin CF_9 of the final histogram HistoF. The following formula may be used for better illustrating the numerical combination:

$$CX\_Y - C(X+1)\_Y = CF\_(X+(Y-1)*n),$$

where X is the histogram order number, Y is the bin order number, and n is the granularity coefficient corresponding to the first fraction PF defined above.

It should be noted that the numerical combination is iterative. More particularly, the eighth bin of the final histogram HistoF may be calculated according to the following formula:

$$CF\_8=C8\_1-C1\_2.$$

The sixteenth bin of the final histogram HistoF is calculated as below:

$$CF\_16=C8\_2-C1\_3.$$

The sixty-fourth bin of the final histogram HistoF is calculated according to the following formula:

$$CF\_64=C8\_8-C1\_1.$$

It may be seen that the final histogram HistoF has 64 histogram bins instead of 8 bins in the case of the first histogram Histo1. Thus, a final differential histogram HistoF is obtained having a finer time granularity than that of the first histogram Histo1 without implementing conventional complex high-frequency circuits.

Variations of the implementations and embodiments described above may be used in different embodiments. Thus, although a preparation of the first histogram H1 from multiple successive processings has been described, a system may also be used that is capable of generating this first histogram in one iteration (a single processing) with an implementation in which there are as many counters as bins.

What is claimed is:

1. A method, comprising:
   generating, by a multi-phase locked loop, a plurality of clock signals each having an identical clock period and a different phase;
   selecting, by a multiplexer and in response to a first phase selection signal, a first clock signal from the plurality of clock signals, the first clock signal having zero phase;
   selecting, by the multiplexer and in response to a second phase selection signal, a second clock signal from the plurality of clock signals, the second clock signal having a first delay relative to the first clock signal, the first delay comprising a fraction of the clock period;
   generating a first timing signal and a second timing signal for an optical emitter based on the first clock signal and the second clock signal, respectively, wherein the second timing signal is delayed relative to the first timing signal by the first delay;
   emitting, by the optical emitter and in response to the first timing signal, a periodic optical pulse having an optical period for a first plurality of optical periods, wherein the optical period comprises a plurality of clock periods, and wherein each optical pulse in the first plurality of optical periods coincides in time with a triggering edge of the first clock signal;
   emitting, by the optical emitter and in response to the second timing signal, the periodic optical pulse having the optical period for a second plurality of optical periods, wherein each optical pulse in the second plurality of optical periods coincides in time with a triggering edge of the second clock signal;
   generating, by a sensor array and in response to reception of a reflection from an object of the periodic optical pulse for the first plurality of optical periods, a respective plurality of first sensor signals for each of the first plurality of optical periods;
   generating, by a processor, a respective non-overlapping portion of a first histogram indicative of a distance between the object and the optical emitter based on the respective plurality of first sensor signals, the first histogram having a first time granularity;
   generating, by the sensor array and in response to reception of a reflection from the object of the periodic optical pulse for the second plurality of optical periods, a respective plurality of second sensor signals for each of the second plurality of optical periods;
   generating, by the processor, a respective non-overlapping portion of a second histogram indicative of the distance between the object and the optical emitter based on the respective plurality of second sensor signals, the second histogram having the first time granularity; and
   generating, by the processor, a final histogram having a second time granularity finer than the first time granularity based on the first histogram and the second histogram.

2. The method of claim 1, wherein the optical period is equal to an integer multiple of the clock period.

3. The method of claim 1, wherein the triggering edge of the first clock signal comprises a rising edge of the first clock signal.

4. The method of claim 1, wherein the clock period comprises a time between consecutive triggering edges of the first clock signal.

5. The method of claim 1, wherein the first time granularity comprises an integer multiple of the fraction of the clock period.

6. The method of claim 5, wherein the first time granularity is less than or equal to the clock period.

7. The method of claim 1, wherein the second time granularity is less than the fraction of the clock period.

8. The method of claim 1, wherein generating, by the processor, the final histogram having the second time granularity finer than the first time granularity based on the first histogram and the second histogram comprises subtracting the second histogram from the first histogram.

9. An electronic device, comprising:
   a multi-phase locked loop configured to generate a plurality of clock signals each having an identical clock period and a different phase;
   a multiplexer coupled to the multi-phase locked loop and configured to:
      select a first clock signal from the plurality of clock signals in response to a first phase selection signal, the first clock signal having zero phase; and
      select a second clock signal from the plurality of clock signals in response to a second phase selection signal, the second clock signal having a first delay relative to the first clock signal, the first delay comprising a fraction of the clock period;
   a time generator circuit configured to generate a first timing signal and a second timing signal based on the first clock signal and the second clock signal, respectively, wherein the second timing signal is delayed relative to the first timing signal by the first delay;
   an optical emitter configured to:
      emit, in response to the first timing signal, a periodic optical pulse having an optical period for a first plurality of optical periods, wherein the optical period comprises a plurality of clock periods, and wherein each optical pulse in the first plurality of optical periods coincides in time with a triggering edge of the first clock signal; and emit, in response to the second timing signal, the periodic optical pulse having the optical period for a second plurality of optical periods, wherein each optical pulse in the second plurality of optical periods coincides in time with a triggering edge of the second clock signal;

a sensor array configured to:

generate, in response to reception of a reflection from an object of the periodic optical pulse for the first plurality of optical periods, a respective plurality of first sensor signals for each of the first plurality of optical periods; and generate, in response to reception of a reflection from the object of the periodic optical pulse for the second plurality of optical periods, a respective plurality of second sensor signals for each of the second plurality of optical periods; and a processor configured to:

generate a respective non-overlapping portion of a first histogram indicative of a distance between the object and the optical emitter based on the respective plurality of first sensor signals, the first histogram having a first time granularity;

generate a respective non-overlapping portion of a second histogram indicative of the distance between the object and the optical emitter based on the respective plurality of second sensor signals, the second histogram having the first time granularity; and generate a final histogram having a second time granularity finer than the first time granularity based on the first histogram and the second histogram.

10. The electronic device of claim 9, wherein the optical period is equal to an integer multiple of the clock period.

11. The electronic device of claim 9, wherein the triggering edge of the first clock signal comprises a rising edge of the first clock signal.

12. The electronic device of claim 9, wherein the clock period comprises a time between consecutive triggering edges of the first clock signal.

13. The electronic device of claim 9, wherein the first time granularity comprises an integer multiple of the fraction of the clock period.

14. The electronic device of claim 13, wherein the first time granularity is less than or equal to the clock period.

15. The electronic device of claim 9, wherein the second time granularity is less than the fraction of the clock period.

16. The electronic device of claim 9, wherein the processor is configured to generate the final histogram having the second time granularity finer than the first time granularity based on the first histogram and the second histogram by at least subtracting the second histogram from the first histogram.

17. A non-transitory computer-readable storage medium storing a program to be executed by a device, the program including instructions for:

generating, by a multi-phase locked loop of the device, a plurality of clock signals each having an identical clock period and a different phase;

selecting, by a multiplexer of the device and in response to a first phase selection signal, a first clock signal from the plurality of clock signals, the first clock signal having zero phase;

selecting, by the multiplexer and in response to a second phase selection signal, a second clock signal from the plurality of clock signals, the second clock signal having a first delay relative to the first clock signal, the first delay comprising a fraction of the clock period;

generating, by a time generation circuit of the device, a first timing signal and a second timing signal for an optical emitter of the device based on the first clock signal and the second clock signal, respectively, wherein the second timing signal is delayed relative to the first timing signal by the first delay;

emitting, by the optical emitter and in response to the first timing signal, a periodic optical pulse having an optical period for a first plurality of optical periods, wherein the optical period comprises a plurality of clock periods, and wherein each optical pulse in the first plurality of optical periods coincides in time with a triggering edge of the first clock signal;

emitting, by the optical emitter and in response to the second timing signal, the periodic optical pulse having the optical period for a second plurality of optical periods, wherein each optical pulse in the second plurality of optical periods coincides in time with a triggering edge of the second clock signal;

generating, by a sensor array of the device and in response to reception of a reflection from an object of the periodic optical pulse for the first plurality of optical periods, a respective plurality of first sensor signals for each of the first plurality of optical periods;

generating, by a processor of the device, a respective non-overlapping portion of a first histogram indicative of a distance between the object and the optical emitter based on the respective plurality of first sensor signals, the first histogram having a first time granularity;

generating, by the sensor array and in response to reception of a reflection from the object of the periodic optical pulse for the second plurality of optical periods, a respective plurality of second sensor signals for each of the second plurality of optical periods;

generating, by the processor, a respective non-overlapping portion of a second histogram indicative of the distance between the object and the optical emitter based on the respective plurality of second sensor signals, the second histogram having the first time granularity; and generating, by the processor, a final histogram having a second time granularity finer than the first time granularity based on the first histogram and the second histogram.

18. The non-transitory computer-readable storage medium of claim 17, wherein the device comprises a proximity sensor.

19. The non-transitory computer-readable storage medium of claim 17, wherein the second time granularity is less than the fraction of the clock period.

20. The non-transitory computer-readable storage medium of claim 17, wherein the first time granularity is less than or equal to the clock period.

* * * * *